United States Patent

Motosugi

[19]

[11] Patent Number: 5,934,507
[45] Date of Patent: Aug. 10, 1999

[54] REFUELING MACHINE HAVING NO ELECTRICALLY ACTUATED MEANS IN AN EXPLOSIVE AREA

[75] Inventor: Kenji Motosugi, Kawagoe, Japan

[73] Assignee: Aventis Research & Technololgies Gmbh & Co KG, Frankfurt am Main, Germany

[21] Appl. No.: 08/838,668

[22] Filed: Apr. 9, 1997

[30] Foreign Application Priority Data

Apr. 18, 1996 [JP] Japan .................................... 8-096614

[51] Int. Cl.$^6$ ...................................................... B67D 5/06
[52] U.S. Cl. ................................ 222/23; 222/52; 222/63; 222/504; 73/861.77
[58] Field of Search .................................. 222/23, 39, 52, 222/63, 504; 364/513.5, 510; 73/861.77, 861.89

[56] References Cited

U.S. PATENT DOCUMENTS

| | | | |
|---|---|---|---|
| 4,660,153 | 4/1987 | Yamashita et al. ................... | 364/513.5 |
| 4,885,943 | 12/1989 | Tootell et al. ................... | 73/861.89 X |
| 4,887,469 | 12/1989 | Shaptaw ............................... | 73/861.77 |
| 5,563,707 | 10/1996 | Prass et al. ............................. | 356/361 |
| 5,640,234 | 6/1997 | Roth et al. ............................. | 356/128 |
| 5,644,069 | 7/1997 | Liu et al. ............................... | 73/73.2 |

FOREIGN PATENT DOCUMENTS

| | | |
|---|---|---|
| 0598340 | 11/1993 | European Pat. Off. . |
| 60-172700 | 9/1985 | Japan . |

*Primary Examiner*—Gregory L. Huson
*Attorney, Agent, or Firm*—Foley & Lardner

[57] ABSTRACT

An inexpensive refueling machine having high safety is disclosed. The refueling machine comprises a nozzle box disposed at a place which is likely to be exposed to an explosive atmosphere and having a valve for controlling the start and stop of refueling to a nozzle, and a console box disposed at a place which is unlikely to be exposed to an explosive atmosphere and having a control unit for controlling the operation of the valve. Electric equipment is not contained in the nozzle box but in the console box. The nozzle box and the console box are interconnected by pipes which pass a compressed air for controlling the operation of the valve and an optical fiber which transmits an output of flowmeter and signals of fuel sensor probe. The refueling machine may have means for distinguishing a kind of fuel.

23 Claims, 3 Drawing Sheets

REFUELING MACHINE HAVING NO ELECTRICALLY ACTUATED MEANS IN AN EXPLOSIVE AREA

BACKGROUND OF THE INVENTION

1. Field of the Invention

The present invention relates to an inexpensive refueling machine having high safety.

2. Description of the Related Art

Electric equipment such as a pump, a motor, a flowmeter, an indicator and a control circuit is built in a refueling machine conventionally used at a gas station for such a fuel as gasoline and light oil. The electric equipment is used in an explosive atmosphere. As a result, such electric equipment must be structured to be explosion-proof, causing the cost of a refueling machine to go up. Further, since the electric equipment is disposed in an explosive atmosphere although being resistant against explosion, it is impossible to completely avoid the danger of explosion and there has been a need for improvement for further enhancing the safety of a gas station.

Such a proposal has been made by, for example, Japanese Patent Laid-open No. 60-172700 that some equipment of a refueling machine is disposed at an inexplosive place, paying attention to an island provided in a gas station for the purpose of making automobiles come in and go out of the gas station, thereby avoiding such equipment of the refueling machine from being structured to be explosion-resistant. FIG. 1 schematically shows a cross section of a refueling machine disclosed in the above Official Gazette. An island I is provided in site D of a gas station, and a first motor M1, a first pump P1, a second motor M2 and a second pump P2 provided in correspondence with the kind of fuels are contained within the Island I. A first casing 1 supported by a pole 3 on the island I and containing first and second refueling amount indicators 4a, 4b in an airtight manner is provided at an inexplosive place. Consequently, the electric equipment contained within the first case 1 does not have to have an explosion-proof structure. Electric wires 5 extending from those refueling amount indicators pass through the island I and are then connected to pulse transmitters 6a, 6b within a second casing 2.

Within the second casing are provided flowmeters 7a, 7b respectively connected to the pulse transmitters 6a, 6b. Pipes L1, L2 extending from the pumps P1, P2 are connected through flowmeters 7a, 7b to refueling nozzles 8a, 8b, respectively.

As such, the refueling machine disclosed in Japanese Patent Laid-open No. 60-172700 is structured in such a manner that the first casing 1 provided outside of an inexplosive place is connected through pipes L1, L2 and wires 5 to the second casing 2 provided in an explosive place. Since such electric equipment as the pulse transmitters 6a, 6b is contained in the second casing 2 provided in an explosive place and the motors M1, M2 and the pumps P1, P2 are provided in the island I, the electric equipment contained in the second casing 2 and the island I must be structured to be explosion-resistant. consequently, the proposal described above has a limit to a cost reduction of a refueling machine and does not substantially enhance the safety of a refueling machine.

SUMMARY OF THE INVENTION

The present invention has been made to solve the problems as described above and an object of the invention is to provide an inexpensive refueling machine having high safety.

In order to achieve the object of the invention, the present invention provides a refueling machine comprising:

a nozzle unit provided in a place which is likely to be exposed to an explosive atmosphere and having mechanical means for controlling a flow of fuel supplied through a hose to a nozzle, said nozzle unit having no electrically actuated means;

a console unit provided in a place which is unlikely to be exposed to an explosive atmosphere, said console unit comprising electric equipment which includes a refueling control unit for outputting non-electric signals to control the operation of s aid mechanical means; and transmitting means for interconnecting said nozzle unit and said console unit to transmit said non-electric signals.

In an embodiment of a refueling machine according to the present invention, said nozzle unit further comprises a flowmeter for measuring an amount of refueled fuel. A result of measurement made by the flowmeter is sent to said refueling control unit through an optical fiber to enable said refueling control unit to control the operation of said mechanical means in accordance with the result of measurement. Said flowmeter comprises a pulse generator for converting light introduced through the optical fiber from said refueling control unit to optical pulses the number of which is in proportion to the result of measurement made by the flowmeter. The optical pulses are sent to said refueling control unit through the optical fiber. Said nozzle unit further comprises a fuel sensor probe which detects the kind of fuel in a fuel tank of automobile to be refueled, and said console unit further comprises a fuel sensor controller connected through an optical fiber to said fuel sensor probe to enable said refueling control unit to control said mechanical means in accordance with a result of distinction made by the fuel sensor controller.

According to the present invention, a fuel sensor unit mainly comprises the fuel sensor probe, the fuel sensor controller and the optical fibers interconnecting those units. The fuel sensor probe is a portion of the fuel sensor unit, which does not contain any electric and electronic equipment, said portion comprising a sensor chip, a housing, ends of the optical fibers and gas flow passage. The fuel sensor controller comprises a light source, a light detector for converting reflected light intensity to an electric signal, and electric and electronic equipment which calculates the kind of fuel.

Said nozzle unit further comprises a nozzle switch for detecting that said nozzle has been taken off. A result detected by the nozzle switch is sent to said refueling control unit through an optical fiber, enabling said refueling control unit to control the operation of said mechanical means. Said console unit further comprises a solenoid valve controlled by said refueling control unit and connected to said transmitting means. According to the activation and deactivation of said solenoid valve, said console unit transmits a non-electric signal to said mechanical means through said transmitting means to control said mechanical means.

As will be clear from the above description of the present invention, since a refueling machine according to the present invention comprises a nozzle unit provided in a place which is likely to be exposed to an explosive atmosphere and having mechanical means for controlling a flow of fuel supplied to a nozzle and a console unit provided in a place which is unlikely to be exposed to an explosive atmosphere and having electric equipment which controls the operation of the mechanical means, and transmitting means for interconnecting said nozzle unit and said console unit to transmit a non-electric signals for controlling the operation of the mechanical means, the refueling machine according to the present invention is safe in nature and much more safer than a conventional refueling machine. Further, the console unit can be disposed at a place which is unlikely to be exposed to an explosive atmosphere and the electric equipment within the console unit need not be explosion-proof, resulting in the provision of an inexpensive refueling machine.

The above and other objects and features of the present invention may be more readily understood with reference to the following detailed description taken in conjunction with the accompanying drawings.

DESCRIPTION OF THE PREFERRED EMBODIMENT OF THE INVENTION

Figure 1:
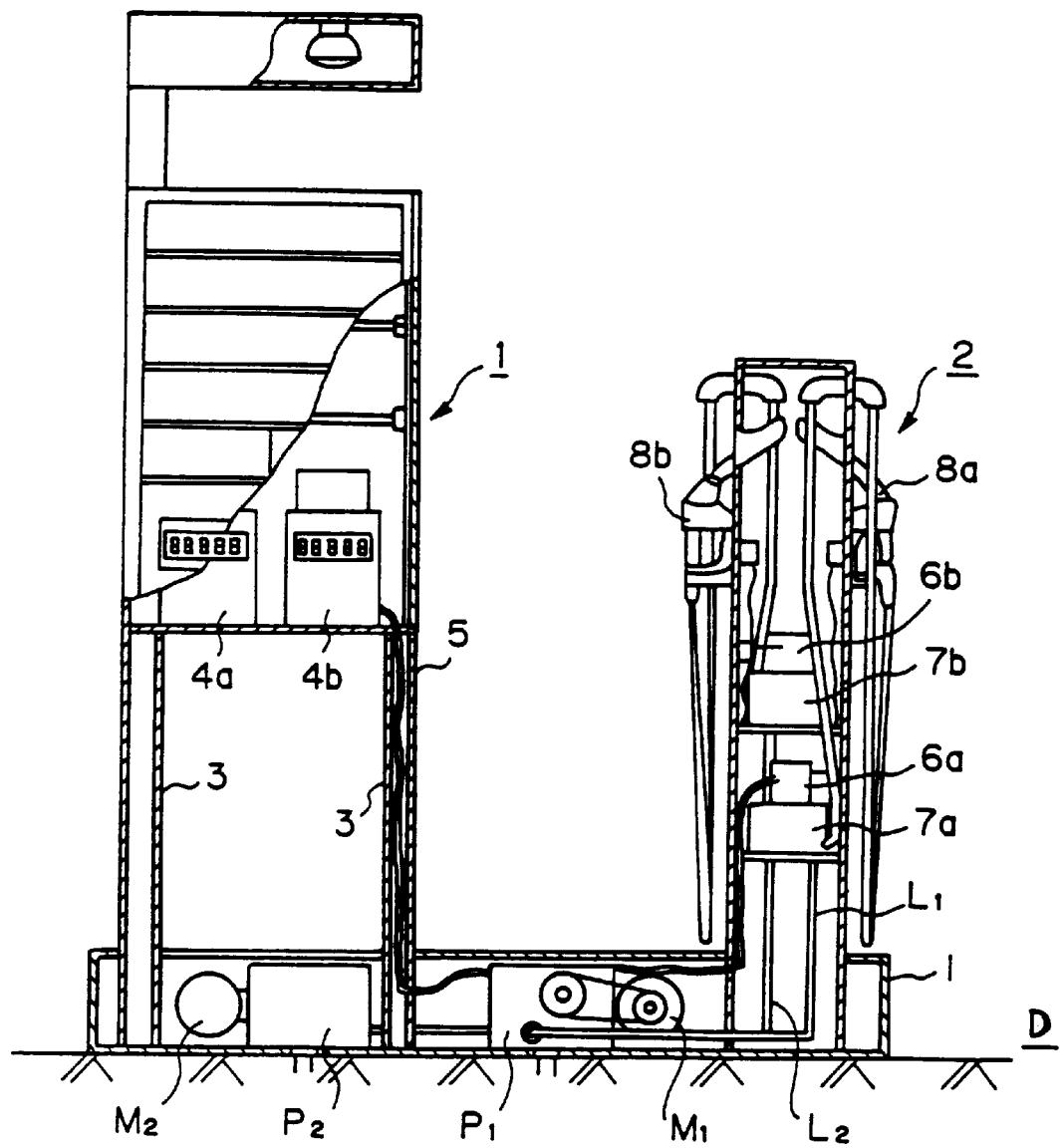
FIG. 1 is used to explain the refueling machine disclosed in Japanese Patent Laid-open No. 60-172700.
Figure 2:
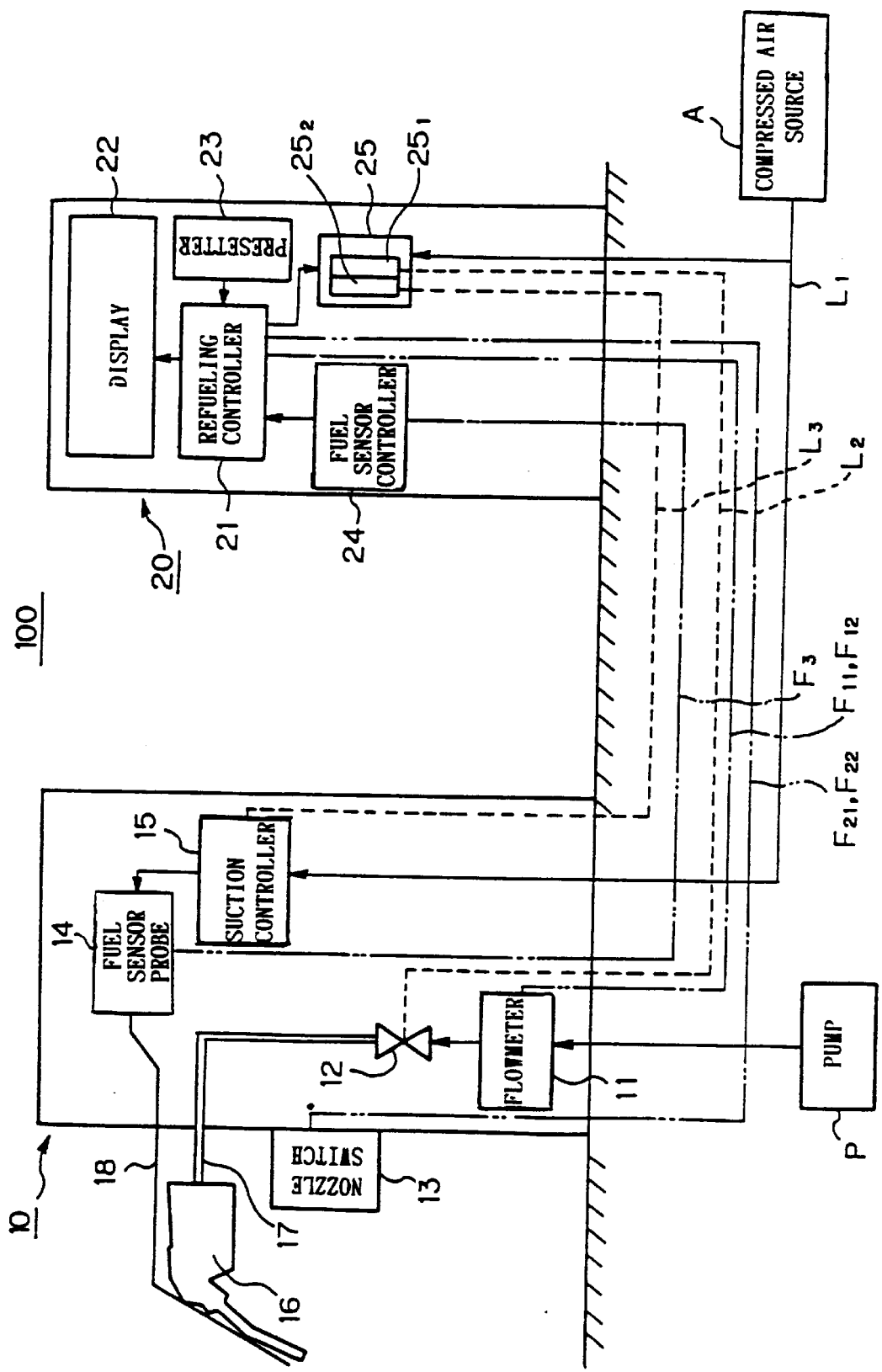
FIG. 2 schematically illustrates the structure of a refueling machine according to the present invention.

An embodiment of a refueling machine according to the present invention will be explained in detail hereafter with reference to the attached drawings. FIG. 2 schematically shows an embodiment of a refueling machine according to the present invention, wherein a submerged fuel pump is used. In FIG. 2, a refueling machine 100 comprises two portions, a nozzle box 10 disposed in a place which is likely to be exposed to an explosive atmosphere and a console box 20 disposed in a place which is unlikely to be exposed to an explosive atmosphere.

Within the nozzle box 10, there are provided a flowmeter 11, a valve 12, a nozzle switch 13, a fuel sensor probe 14 and a suction control unit 15. A nozzle 16 and a hose 17 is provided outside of the nozzle box 10. A fuel supplied from a submerged fuel pump P is supplied to the hose 17 through the flowmeter 11 and the valve 12 and a compressed air is fed from a compressed air source A to the suction control unit 15. The console unit 20 contains therein such electric equipment as a refueling control unit 21, a display unit 22, a presetter 23, a fuel sensor controller 24 and a solenoid valve unit 25. A compressed air is supplied to the solenoid valve unit 25 from the compressed air source A through a pipe L1. The nozzle box 10 and the console box 20 are interconnected by optical fibers F11, F12, F21, F22, a group of optical fibers F3 and pipes L2, L3.

Figure 3:
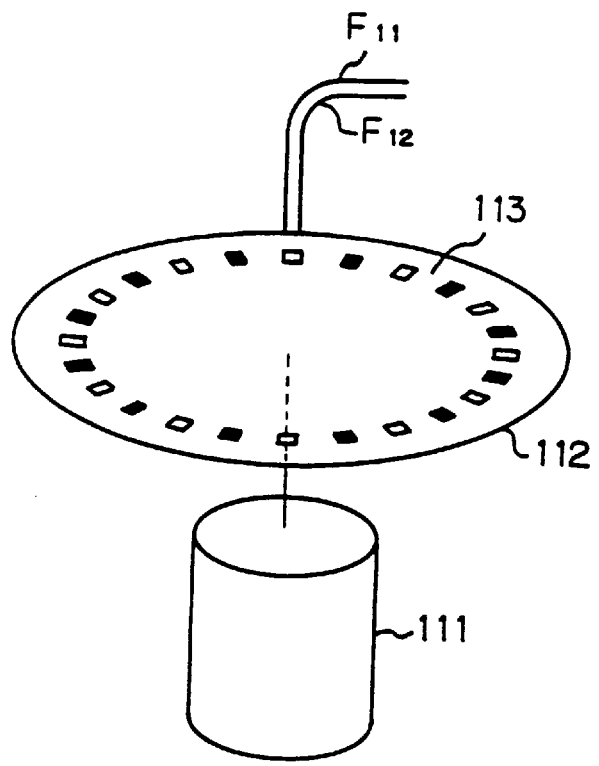
FIG. 3 illustrates an example of a pulse generator coupled to a flowmeter shown in FIG. 2.
Figure 4:
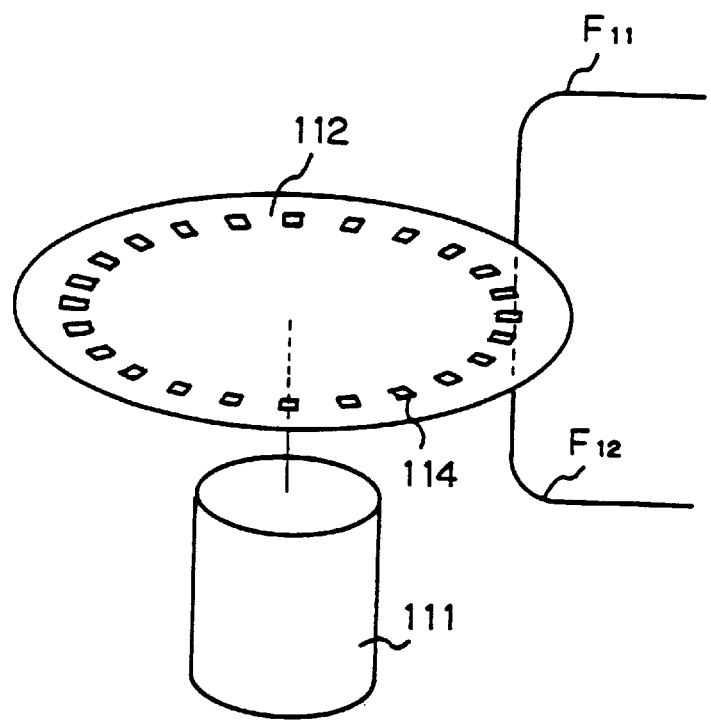
FIG. 4 illustrates another example of a pulse generator coupled to a flowmeter shown in FIG. 2.

The operations of the respective structural components of the nozzle box 10 and the console box 20 will be explained hereafter. In the nozzle box 10, any type of flowmeter can be used as the flowmeter 11 through which a fuel such as gasoline and light oil supplied from the submerged fuel pump P to the hose 17, and a flowmeter of a piston volume type or a flowmeter using an oval gear may be preferred as the flowmeter 11. Flow data measured by the flowmeter 11 is transmitted to the refueling control unit 21 within the console box 20 through a pulse generator (not shown) coupled to the flowmeter 11. To this end, as shown in FIGS. 3 and 4, the pulse generator comprises a rotor 111 which rotates step by step for each unit flow in accordance with the amount of flow of a liquid or at angular velocity proportioned to the amount of flow of a liquid. The pulse generator further comprises a disk 112 coupled directly or via gears to the rotor 111 and having along a peripheral portion of the disk alternating black and white patterns 113 or holes 114 formed at a constant interval. Continuous light produced by the refueling control unit 21 is introduced through the optical fiber F11 to the disk 112 and illuminates the alternating black and white patterns or the holes 114 formed at a constant interval along the periphery. The light introduced by the optical fiber F11 is converted to optical pulses having the number proportionate to the amount of flow due to the difference in reflectivity of the alternating black and white patterns 113 or due to transmitting and screening actions exhibited by the holes 114. The light pulses are transmitted to the refueling control unit 21 through the optical fiber F12. The amount of refueled fuel is shown on the display at the display unit 22.

The valve 12 provided between flowmeter 11 and the hose 17 in the nozzle box 10 is an air-operated valve which is opened and closed by a compressed air. A compressed air is controlled to be sent to the pipe L2 by the first solenoid valve 25, within the solenoid valve unit 25 to open and close the valve 12. Thus, the refueling control unit 21 controls to open the solenoid valve 25, during refueling, thereby supplying a compressed air from the compressed air source A to the valve 12 through the pipe L2. As a result, the valve 12 is kept open and supplies a fuel from the submerged fuel pump P to the hose 17. When the refueling control unit 21 decides to stop supplying a fuel to the nozzle 16 if an amount of fuel preset by the presetter 23 within the console box 20 has been refueled or in an emergency, the refueling control unit 21 closes the solenoid valve 25, and prevents a compressed air from being supplied from the compressed air source A. As a result, the valve 12 is closed and refueling is stopped.

The nozzle switch 13 in the nozzle box 10 is provided to automatically or manually detect that the nozzle which was hang up to a nozzle hanger (not shown) has been taken off and inform the refueling control unit 21 within the console box 20 of that fact through the optical fibers F21, F22. In order to detect whether or not the nozzle 16 has been taken off, the nozzle switch 13 has an optical switch which changes an optical reflectivity or an transmissivity by a lever operated mechanically in response to the fact that the nozzle 16 has been taken off or a lever manually operated when the nozzle 16 is taken off. The optical switch is connected to the refueling control unit 21 within the console box 20 through the optical fibers F21, F22. More specifically, the refueling control unit 21 sends continuous light to the nozzle switch 13 through the optical fiber F21, thereby whether the nozzle is hung on or taken off is converted to whether light exists or not or whether light is strong or weak by the optical switch. A result of the conversion is sent to the refueling control unit 21 through the optical fiber F22.

The fuel sensor probe 14 may be a unit of any type which does not electrically transmit a result of detection of a fuel kind. The unit 14 includes a polymer thin film which exhibits different reflectivities to different kinds of fuel vapor when the polymer thin film is illuminated by light transmitted from the light source within the console box 20 through an optical fiber of the optical fiber group F3. Light reflected by the polymer thin film is sent to the fuel sensor controller 24 within the console box 20 through a light receiving optical fiber of the optical fiber group F3. The fuel sensor controller 24 in turn distinguishes the kind of fuel and sends the result of the distinction to the refueling control unit 21. In order to enable the fuel sensor probe 14 to detect the kind of fuel, a tube 18 interconnects the fuel sensor probe 14 and an end of the nozzle 16 and the suction control unit 15 comprising an ejector, a regulator and an air operated valve is provided. When the refueling control unit 21 is informed by the nozzle switch 13 through the optical fiber F21, F22 that the nozzle 16 has been taken off from the nozzle hanger, the refueling control unit 21 causes the second solenoid valve 25, within the solenoid valve unit 25 to change from an opened (closed) condition to a closed (opened) condition. Opening or closing the second solenoid valve 25, allows a compressed air to be supplied through the pipe L3 to the suction control unit 15 or inhibits a compressed air from being supplied through the pipe L3 to the suction control unit 15, thereby causing the suction control unit 15 to start a sucking operation. When the nozzle 16 is inserted to a refueling mouth of a fuel reservoir such as a fuel tank of an automobile, a vapor within the fuel reservoir is introduced through the tube 18 to the fuel sensor probe 14. Upon receiving a change in light intensity through the optical fiber group F3 from the fuel sensor probe 14, the fuel sensor controller 24 distinguishes a kind of fuel and sends a result of the distinction to the refueling control unit 21. The refueling control unit 21 controls the operation of the first solenoid valve 25, and, therefore, the valve 12 in accordance with whether or not the result of the distinction made by the fuel sensor controller 24 coincides with the kind of fuel predetermined by the presetter 23, thereby preventing erroneous refueling. The refueling control unit 21 may cause the display 22 to indicate thereon the kind of fuel designated by the presetter 23.

As described above, the refueling control unit 21 within the console unit 20 controls the overall operation of the refueling machine 100 including the valve 12 in response to the signals outputted from nozzle switch 13, the fuel sensor probe 14, presetter 23 and the fuel sensor controller 24.

The invention has been described in detail with particular reference to a certain preferred embodiment thereof, but it will be understood that variations and modifications can be effected within the spirit and scope of the invention.

What is claimed is:

1. A refueling machine, comprising:
    a nozzle unit provided in a place that is likely to be exposed to an explosive atmosphere and having mechanical means for controlling a flow of fuel supplied through a hose to a nozzle, said unit having no electrically actuated means;
    a console unit, provided in a place that is unlikely to be exposed to an explosive atmosphere, said console unit comprising electric equipment including a refueling control unit for outputting non-electric signals to control the operation of said mechanical means; and
    transmitting means for interconnecting said nozzle unit and said console unit to transmit non-electric signals.

2. A refueling machine as claimed in claim 1, wherein said nozzle unit further comprises a flowmeter connected to said refueling control unit by an optical fiber, and wherein a result of measurement made by said flowmeter is sent to said refueling control unit to enable said refueling control unit to control the operation of said non-electric mechanical means.

3. A refueling machine as claimed in claim 2, wherein said flowmeter comprises a pulse generator for converting light, introduced through the optical fiber from said refueling control unit, to optical pulses, the number of optical pulses being proportional to the measurement made by the flowmeter, and wherein the optical pulses are sent to said refueling control unit through the optical fiber.

4. A refueling machine as claimed in claim 1 wherein said nozzle unit further comprises a fuel kind detecting unit, and wherein said console unit further comprises an oil kind discriminating unit connected through an optical fiber to said fuel kind detecting unit to enable said refueling control unit to control said mechanical means in accordance with a result of discrimination made by the fuel kind discriminating unit.

5. A refueling machine as claimed in claim 1, wherein said nozzle unit further comprises a nozzle switch for detecting that the nozzle has been taken off, and wherein a result detected by said nozzle switch is sent to said refueling control unit through an optical fiber, enabling said refueling control unit to control said non-electric mechanical means.

6. A refueling machine as claimed in claim 1, wherein said console unit further comprises a solenoid valve controlled by said refueling control unit, and wherein said console unit transmits a non-electric signal to said non-electric mechanical means in accordance with the operation of said solenoid valve.

7. A refueling machine, comprising:
    a nozzle unit having a flowmeter to control the output of a fuel, wherein said nozzle unit has no electrically actuated components; and
    a console unit connected to said nozzle unit by a plurality of optical fibers and at least one pipe, wherein said console unit is located in an area that is unlikely to be subject to explosion, and wherein said console unit comprises a refueling control unit for outputting non-electric signals to control the operation of the components in said nozzle unit.

8. A refueling machine as claimed in claim 7, wherein said nozzle unit comprises a flowmeter, said flowmeter transmitting flow data to said a refueling control unit.

9. A refueling machine as claimed in claim 8, wherein said nozzle unit further comprises an air-operated valve provided between said flowmeter and the nozzle and wherein said console unit further comprises a solenoid valve unit, said refueling control unit controls a first solenoid valve in said solenoid valve unit whereby said air-operated valve is opened and closed.

10. A refueling machine as claimed in claim 9, wherein a pulse generator transmits flow data from said flowmeter to said refueling control unit.

11. A refueling machine as claimed in claim 10, wherein said pulse generator converts light, introduced through the optical fiber from said refueling control unit, to optical pulses, the number of optical pulses being proportional to the measurement made by the flowmeter.

12. A refueling machine as claimed in claim 9, further comprising a nozzle switch connected to said refueling control unit through at least one of said plurality of optical fibers, wherein said nozzle switch detects and informs said refueling control unit whether a nozzle of said nozzle unit is hung up.

13. A refueling machine as claimed in claim 7, further comprising a non-electric fuel sensor probe connected through a tube to an end of the nozzle, wherein said fuel sensor probe receives a light transmitted from said console unit and transmits a reflected light based on the type of fuel to a fuel sensor controller in said console unit.

14. A refueling machine as claimed in claim 13, further comprising a fuel suction controller, wherein said refueling control unit causes the opening or closing of a second solenoid valve of said solenoid valve unit to allow air to flow to said fuel suction controller, and wherein said fuel suction controller causes fuel vapor from a fuel reservoir to be introduced into said fuel sensor probe.

15. A refueling machine as claimed in claim 14, wherein said refueling control unit compares the type of fuel transmitted from said fuel sensor probe and the type of fuel from a presetter in said console unit to prevent erroneous refueling.

16. A refueling machine as claimed in claim 15, wherein said refueling control unit terminates fueling if the type of fuel transmitted from said fuel sensor probe does not match the type of fuel from said presetter.

17. A refueling machine, comprising:

a nozzle unit, said nozzle unit comprising a flowmeter and a valve located between said flowmeter and the nozzle, wherein said flowmeter controls the flow of a fuel to the nozzle; and a console unit located in an area unlikely to be subject to explosion and connected to said nozzle unit by a plurality of optical fibers and at least one pipe, said console unit comprising a refueling control unit and a solenoid valve unit having first and second solenoid valves, wherein said refueling control unit receives fuel flow data from said flowmeter and controls the opening of said first solenoid valve to supply a compressed air from a compressed air source to said valve in said nozzle unit.

18. A refueling machine as claimed in claim 17, wherein said first solenoid valve is closed when an amount preset by a presetter in said console unit is refueled or in an emergency whereby said valve in said nozzle unit is closed and refueling is stopped.

19. A refueling machine as claimed in claim 18, further comprising a nozzle switch in said nozzle unit, wherein said refueling control unit sends light to said nozzle switch through one of said plurality of optical fibers and an optical switch in said nozzle switch converts the light based on whether the nozzle is hung up and the result of the conversion is sent to said refueling control unit through another of said plurality of optical fibers.

20. A refueling machine as claimed in claim 19, further comprising a fuel sensor probe in said nozzle unit, said fuel sensor probe includes a polymer thin film, said polymer thin film reflecting light to a fuel sensor controller in said console unit through one of said plurality of optical fibers.

21. A refueling machine as claimed in claim 20, further comprising a tube between said fuel sensor probe and an end of the nozzle and a suction control unit in said nozzle unit.

22. A refueling machine as claimed in claim 21, wherein said suction control unit comprises an ejector, a regulator and an air operated valve, and wherein said refueling control unit causes said second solenoid valve to open or close depending on result received from said nozzle switch, said second solenoid valve supplying air from said compressed air source to said suction control unit when opened whereby said air operated valve of said suction control unit sucks fuel vapor into said fuel sensor probe.

23. A refueling machine that is free from electrical communication between an explosive environment and a non-explosive environment, consisting essentially of:

a nozzle unit provided in a place that is likely to be exposed to an explosive atmosphere and having mechanical means for controlling a flow of fuel supplied through a hose to a nozzle;

a console unit, provided in a place that is unlikely to be exposed to an explosive atmosphere, said console unit comprising electric equipment, including a refueling control unit for outputting non-electric signals to control the operation of said mechanical means; and transmitting means for interconnecting said nozzle unit and said console unit to transmit non-electric signals.

* * * * *